Figure 1:
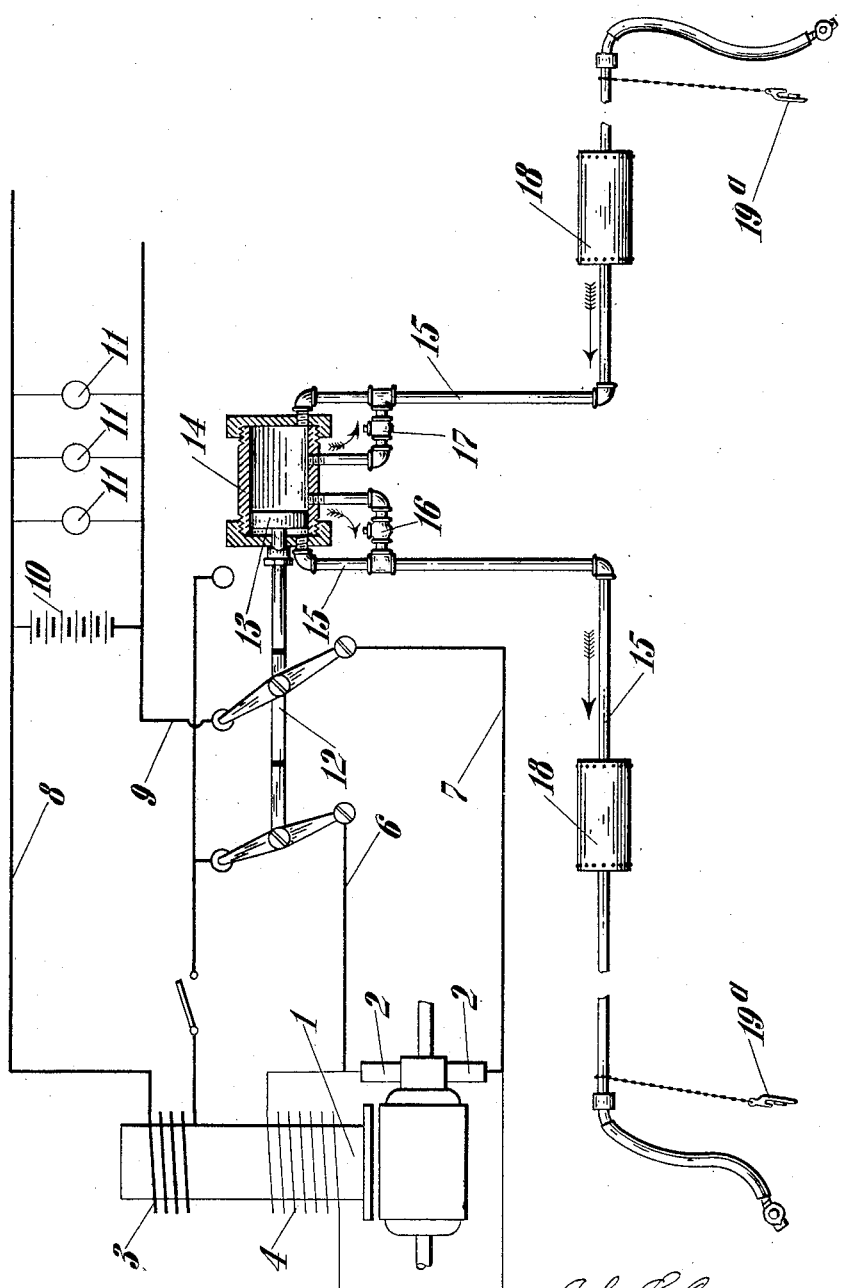
Figure 2:
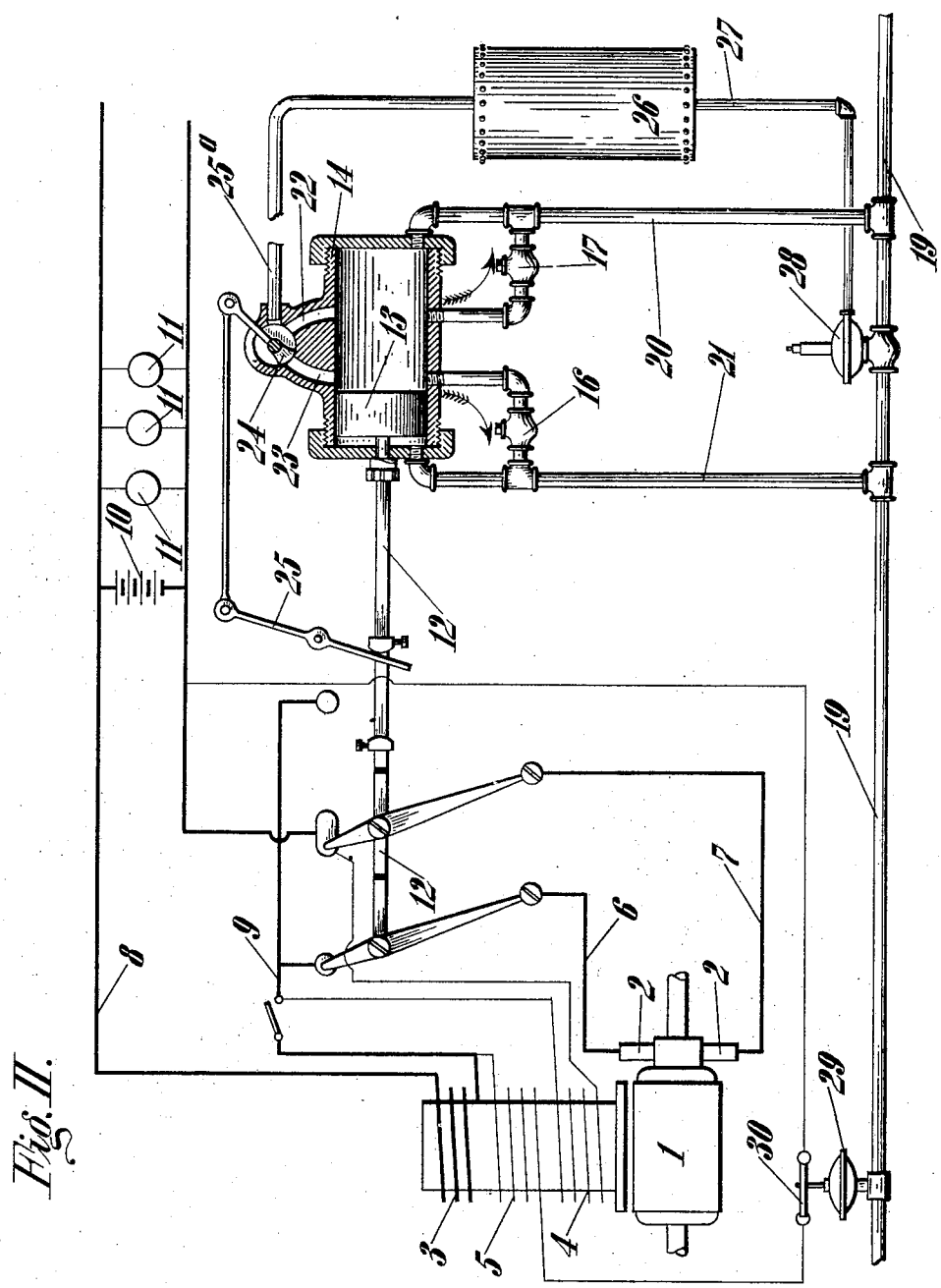
Figure 3:
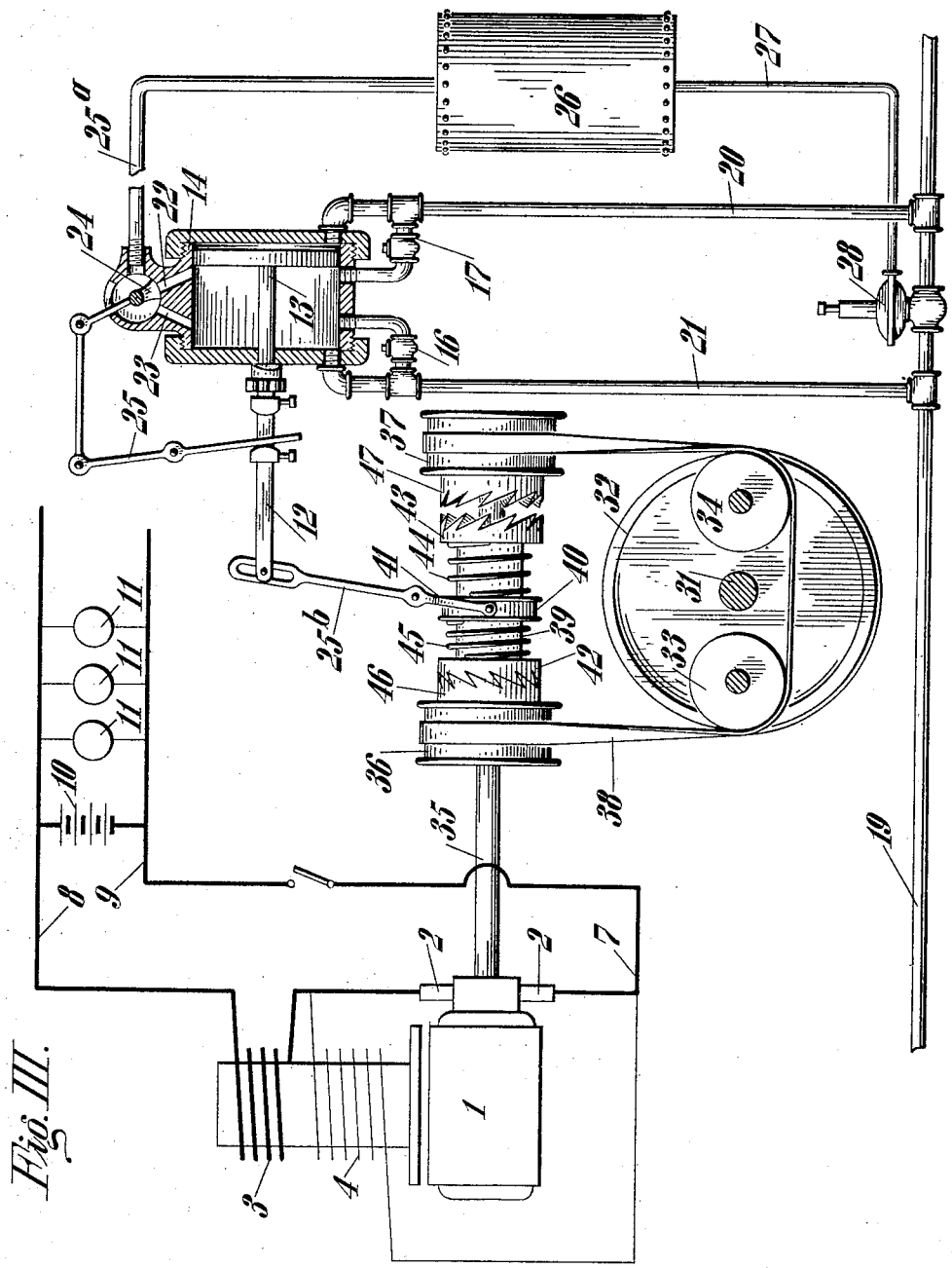
Figure 4:
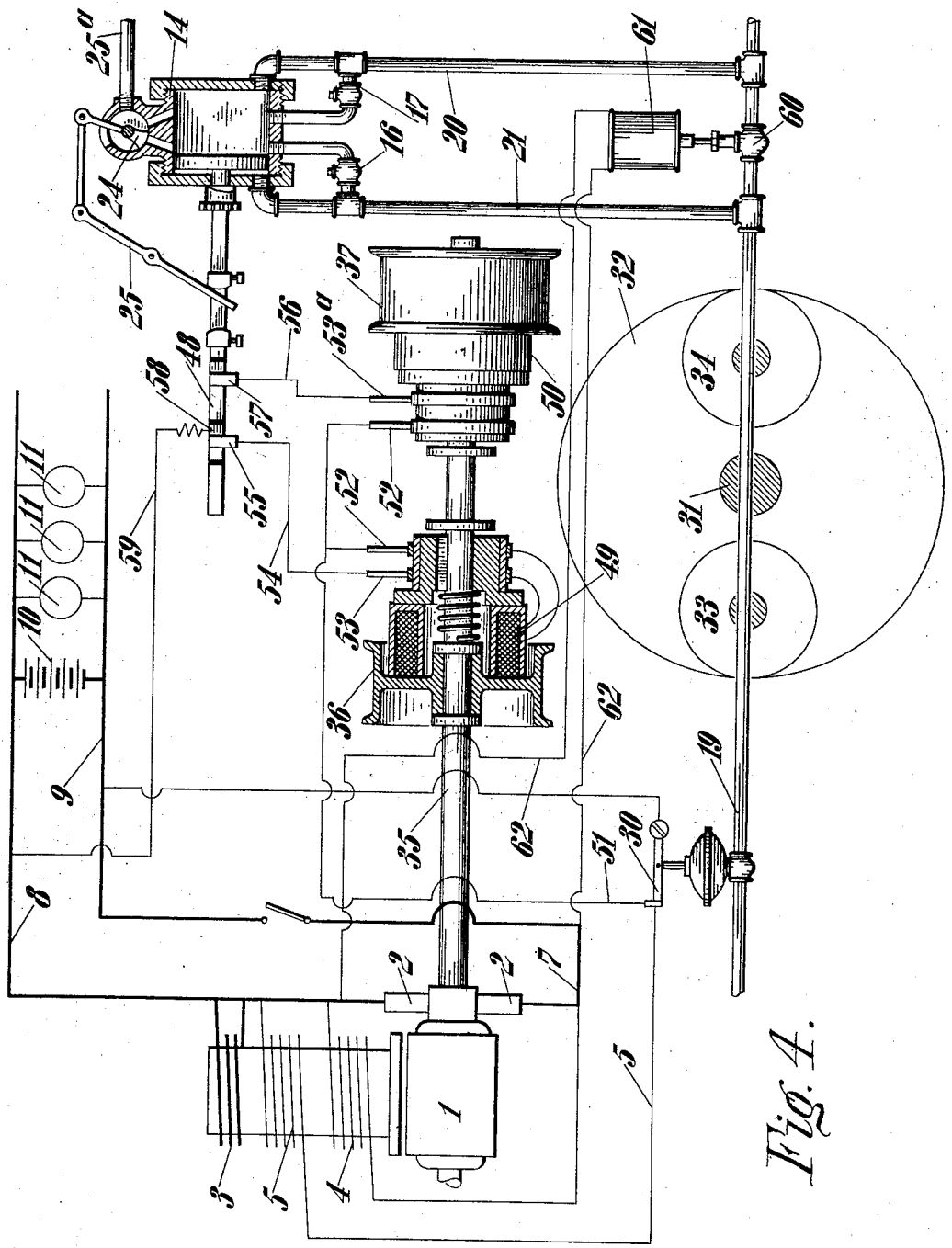

No. 704,694. Patented July 15, 1902.
J. L. CREVELING.
SYSTEM OF DISTRIBUTION.
(Application filed Sept. 11, 1901.)
(No Model.) 4 Sheets—Sheet 1.

No. 704,694. Patented July 15, 1902.
J. L. CREVELING.
SYSTEM OF DISTRIBUTION.
(Application filed Sept. 11, 1901.)

(No Model.) 4 Sheets—Sheet 2.

WITNESSES:

INVENTOR.
BY
ATTORNEYS

No. 704,694. Patented July 15, 1902.
J. L. CREVELING.
SYSTEM OF DISTRIBUTION.
(Application filed Sept. 11, 1901.)

(No Model.) 4 Sheets—Sheet 3.

WITNESSES: INVENTOR.
J. L. Creveling
BY
ATTORNEYS.

No. 704,694. Patented July 15, 1902.
J. L. CREVELING.
SYSTEM OF DISTRIBUTION.
(Application filed Sept. 11, 1901.)
(No Model.) 4 Sheets—Sheet 4.

WITNESSES:
INVENTOR.
BY
ATTORNEYS

UNITED STATES PATENT OFFICE.

JOHN L. CREVELING, OF NEW YORK, N. Y.

SYSTEM OF DISTRIBUTION.

SPECIFICATION forming part of Letters Patent No. 704,694, dated July 15, 1902.

Application filed September 11, 1901. Serial No. 75,015. (No model.)

*To all whom it may concern:*

Be it known that I, JOHN L. CREVELING, a citizen of the United States, residing at the borough of Manhattan, city, county, and State of New York, have invented a certain new and useful Improvement in Systems of Distribution, of which the following is a specification.

My invention relates to systems of electrical distribution, more particularly to systems of electrical distribution upon railway-cars, and has for its special object to produce means for overcoming the reversal of polarity of the generator in connection with the car-axle when the direction of motion of said car is changed by coupling to the train of an engine which will haul such train in the opposite direction.

The invention may be said to consist particularly in means for causing the current generated by the generator to be delivered to the batteries or translating devices always in the same direction by a change of direction of the air-pressure on the said means. The control of the direction of the current is primarily from the air-pressure through any brake system or an auxiliary system receiving its pressure from the engine and is so organized that when the engine is changed from one end of the train to the other and the direction of pressure on the current-governing means reversed the apparatus will be so manipulated as to cause the current generated by the generator to be delivered to the batteries in the same direction as before.

There are various means of carrying out my invention, some of which are shown in the accompanying drawings. In some instances the pole-changer in the dynamo-circuit is actuated to change the direction of the flow of the current, and in other instances the connections of the generator with its source of power are reversed, so that the generator will always be driven in the same direction. In some instances this is accomplished directly by the direction of the flow of the air under pressure through a mechanically-operating clutch, and in other instances the driving connections are reversed indirectly by electromagnetic clutches controlled by the flow of the air under pressure.

In the accompanying drawings I have shown examples of all of these methods, although it will be understood that the drawings are illustrative merely and that I do not mean to confine myself to the structures shown herein.

In the drawings, Figure I shows a means of reversing the connections of the generator in manipulating a pole-changer by pneumatic pressure supplied, as from the locomotive, through an independent train-pipe running throughout the train. Fig. II shows a means for reversing the connections of the generator and is operated by air-pressure through a connection with the air-brake system of the train. Fig. III shows mechanical means for causing the generator to be driven always in one direction regardless of the direction of the car, the mechanical means being governed by air-pressure derived from the brake system. Fig. IV shows a means for causing the generator to be driven in a uniform direction through the instrumentality of electromagnetic clutches operated by pneumatic pressure taken from the brake system.

Similar figures of reference indicate similar parts throughout all the figures.

Referring for the present particularly to Fig. I, 1 indicates the generator; 2, the brushes thereof; 3, a differential series coil; 4, the generator-shunt, and in Figs. II and IV are shown a battery field-coil 5. The mains 6 7 lead to the main circuit 8 9, in which are included the batteries 10 and lamps or other translating devices 11. A pole-changer 12 is provided for reversing the connections of the generator, which pole-changer is operated by a piston 13, moving in a cylinder 14 and connected to an independent train-pipe 15. The train-pipe 15 connects with both heads of the cylinder 14 and also with the side of the cylinder 14 by branches 16 and 17, which are provided with check-valves allowing the passage of air only in the direction indicated by the arrows. When an independent train-pipe 15 is employed, I provide suitable pressure-reservoirs 18, one on either side of the system of branches 16 17, for the purpose of increasing the volume of air from which the operating flow is derived. The principal object, however, of providing the pressure-reservoirs 18 is to increase the space in which the air-pressure is confined, so that in the rear end car of the train a considerable volume of air will be confined, so that the operation will depend upon the flow of a considerable volume of air in equalizing the pressure in the pressure-reservoirs 18 when the direction of flow is reversed. Where the air-brake system is employed, such reservoirs are unnecessary, as the auxiliary reservoirs of the brake system are employed for this purpose.

I preferably provide "dutchmen" or blank couplers 19ª for the closing the free end of the independent train-pipe in order that provision may be made for reducing the pressure or emptying the additional train-pipe system when the engine is detached from one end of the train and an engine is attached to the other.

The mode of operation of the construction shown in Fig. I will be apparent. In the position shown the train is supposed to be coupled to an engine at the right, and consequently the direction of blow in the train-pipe system will be in the direction of the arrows thereon, and the piston 13 will remain at the left-hand extremity of its travel, where it has been placed by the flow of air into the left-hand reservoir 18. However, when the engine is uncoupled and the air in the train-pipe allowed to fall in pressure and an engine is attached to the other end of the train and the train-pipe is connected to the air-supply on the engine the direction of the flow of the train-pipe pressure will be reversed, and as the air cannot flow through the by-pass 16 in the opposite direction the entire pressure will be brought against the inner or left-hand face of the piston 13, which will thereupon be caused to move in the cylinder until it uncovers the part leading to the pipe 17, carrying with it the pole-changer and reversing the connections of the generator.

In Fig. II the cylinder 14 receives air-pressure from the train-pipe 19 through branches 20 21 with the usual valved by-passes 16 and 17. In addition to the parts heretofore described the piston-cylinder 14 is likewise provided with ports 22 and 23, which are controlled by a swinging valve 24, operated by a system of levers 25, actuated by the rod of the piston 13. The chamber of the valve 24, which connects with the ports 22 and 23, is connected to pipe 25, which is the regular brake-supply pipe communicating with the brake-actuating valves and thence with the regular auxiliary reservoir 26 of the brake system. The auxiliary reservoir is connected by pipe 27 to a diaphragm-valve 28 at a point between the points where the branches 20 and 21 are connected to the train-pipe 19. This spring diaphragm-valve 28 controls the passage of air through the train-pipe 19 and is so constructed as to close the train-pipe 19 when the line-pressure falls below a certain predetermined amount. A diaphragm pressure device 29 is also shown, which is adapted to control the switch 30 in the battery field-coil 5. The operation of the construction shown in this figure will be obvious from the drawing. Let it be supposed that the parts are in the positions shown and that the engine at the right-hand end of the train has been uncoupled and that another engine has been coupled to the left-hand end or rear of the train at the left hand of the figure. Of course as soon as the pressure has been reduced by uncoupling the engine the pressure-valves 28 29 will respectively close the train-pipe 19 between the pipes 20 21, and the switch 30 will be operated to open the battery field-coil, so that there will be no waste of current while standing. When the engine has been attached to the rear of the train and the flow of air begins to come from the left-hand end of the figure, the air will flow through the train-pipe 19 from the left and being unable to pass the valve 28 will pass through the pipe 21 into the cylinder 14, thereby forcing the piston 13 to the right, shifting the pole-changer 12, and swinging the lever 25 to cause the valve 24 to swing, opening the port 23, permitting access of air through said port to the auxiliary reservoir 26, so that when the piston has been moved in its cylinder 14 access of air will be permitted to the cylinder 26 only through the port 23 and pipe 25, the port 22 remaining open until the piston shall have passed the same. After the pressure has been pumped up sufficiently to raise the diaphragm-valve 28 at the same time the diaphragm-valve 29 will be operated to close the switch 30 in the battery-shunt. The raising of the diaphragm-valve 28 in each car establishes free communication along the pipe 19 to each air-brake apparatus without causing the full flow to pass through the pipes 20 and 21.

In Fig. III similar figures refer to similar parts throughout. In this figure a clutch mechanism is shown, consisting in the present instance of a car-axle 31, carrying a sheave 32, with two pulleys 33 34 mounted upon brackets (not shown) suspended from the car-truck. On the generator-shaft 35 two pulleys 36 and 37 run freely. A belt 38 passes around the sheave 32, thence around the pulleys 36, 33, 34, and 37 back to the sheave 32. Secured to the shaft 35, but adapted to slide freely thereon, is a sleeve 39, having a slip-collar 40, in which the yoke 41 of the pivot-lever 25 engages. The sleeve 39 carries two clutch members 42 and 43, which are laterally movable with the sleeve 39. The clutch member 42 is adapted to engage with the clutch member 46, connected to the pulley 36, and the clutch member 43 is adapted to engage with a clutch member 47, connected to the pulley 37. The operation of this form of the device is as follows: The piston 13 is thrown from one side or the other of the cylinder in accordance with the flow of the air-pressure in the train-pipe system, and the movement thereof will swing the lever 25ᵇ on its pivot and engage one clutch or the other, so that no matter in which direction the air-pressure flows the generator will always be driven in the same direction and will deliver its current uniformly in the same direction to the translating devices upon reversal of the train.

In Fig. IV, I have shown a construction wherein a bar 48, carried by the piston, is adapted to reverse the electric connection of the two electromagnetic clutches 49 and 50, so as to cause one clutch or the other to couple the pulleys 36 and 37 with the dynamo-shaft 35. The devices by which this is accomplished are the following: The contact of the switch 30 is connected by wire 51 with one terminal 52 of each of the electromagnetic clutches 49 50. The other terminals 53 and 53ª of the clutches are connected as follows: The terminal 53 is connected by wire 54 to a contact 55, coöperating with the bar 48. The terminal 53ª of the clutch 50 is connected by wire 56 to the contact 57, coöperating with the bar 48. The bar 48, which is of insulating material, carries a contact 58, connected by wire 59 to the other side of the battery-circuit. When switch 30 is open, no current will be wasted by flowing through the clutches.

In the construction shown in Fig. IV, I prefer to employ a valve 60 in the train-pipe between the branches 20 and 21 and to operate this valve by a solenoid 61, connected by wire 62 across the brushes of the generator. This solenoid when the generator is delivering current opens the valve 60, so as to permit the air to flow directly through the train-pipe 19, and when the generator is not generating current the passage through the pipe 19 will be closed, so that the air must inevitably pass through 20 and 21 to enable the flow to shift the connections of the clutches 49 or 50 upon the reversal of the direction of the flow in the train-pipe.

Having described my invention and in what manner the same is to be performed, what I claim, and desire to secure by Letters Patent, is as follows:

1. In a system of distribution for railway-trains the combination of a generator and current-utilizing devices and a pneumatic device for affording delivery of current to the current-utilizing devices always in the same direction, the said pneumatic devices being actuated by a change in the direction of the pressure in a pneumatic system on the train.

2. In a system of distribution for railway-trains, the combination of a generator and current-utilizing devices and a pneumatic controlling device for effecting controlling functions in the system, the said pneumatic controlling device being controlled by changes in the direction of pressure in a pneumatic system on the train.

3. In a system of distribution for railway-trains, the combination of a generator and current-utilizing devices, with means for controlling the flow of current, comprising in its structure a pneumatically-actuated device governed by a change in the direction of the pressure in a pneumatic system on the train.

4. In a system of distribution for railway-trains, the combination of a pneumatic system, a pneumatic device under the control thereof, the said pneumatic device being actuated by the change in the direction of flow of air in the system and a connection between the said pneumatic device and other functionating apparatus on the train, whereby by the movement of the said pneumatic device functions and effects may be brought about other than the normal function and effect of the movement of the pneumatic device.

5. A system of distribution for railway-trains, and means for effecting functions therein comprising a single line of train-pipe, a reversible pneumatic device and means whereby the said reversible pneumatic device may be actuated by the change in the direction of flow of air in the single-train-pipe system.

6. In a system of distribution for railway-cars, the combination of an electric system, a pneumatic device for effecting functions therein, a single line of train-pipe and means whereby a reversal of the pneumatic device may be effected by the reversal of the direction of flow of air in the train-pipe system.

7. The combination with a fluid conduit or pipe system allowing the flow of fluid therethrough in either direction, of means for effecting a change in the flow of an electric current and a pneumatic device controlling the said means, the said pneumatic device responding to changes in the direction of flow of fluid in the said conduit or pipe system.

8. The combination with a fluid conduit or pipe system allowing a flow of fluid therethrough in either direction, of an electric switch and a pneumatic device responding to a change in the direction of flow of fluid in the said pipe system.

In testimony whereof I have signed my name to this specification, in the presence of two subscribing witnesses, this 20th day of August, 1901.

JOHN L. CREVELING.

Witnesses:
LINDSLEY SCHEPMOER,
F. E. KESSINGER.